United States Patent
Trainin et al.

(10) Patent No.: US 9,277,419 B2
(45) Date of Patent: Mar. 1, 2016

(54) DEVICE, SYSTEM AND METHOD OF INDICATING STATION-SPECIFIC INFORMATION WITHIN A WIRELESS COMMUNICATION

(71) Applicant: INTEL CORPORATION, Santa Clara, CA (US)

(72) Inventors: Solomon Trainin, Haifa (IL); Assaf Kasher, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/499,400

(22) Filed: Sep. 29, 2014

(65) Prior Publication Data

US 2015/0016341 A1     Jan. 15, 2015

Related U.S. Application Data

(63) Continuation of application No. 12/772,259, filed on May 3, 2010, now Pat. No. 8,873,531.

(51) Int. Cl.
*H04W 16/28* (2009.01)

(52) U.S. Cl.
CPC ..................................... *H04W 16/28* (2013.01)

(58) Field of Classification Search
CPC ............... H04J 2011/0003; H04B 2201/70701
See application file for complete search history.

(56) References Cited

U.S. PATENT DOCUMENTS

| | | | |
|---|---|---|---|
| 7,627,347 B2 | 12/2009 | Codreanu et al. | |
| 7,756,227 B2 | 7/2010 | Gao et al. | |
| 7,848,706 B2 | 12/2010 | Vilzmann et al. | |
| 7,889,809 B2 | 2/2011 | Im et al. | |
| 8,009,617 B2 | 8/2011 | Sarkar et al. | |
| 8,345,732 B2 | 1/2013 | Fischer et al. | |
| 8,873,531 B2 | 10/2014 | Trainin et al. | |
| 2004/0180627 A1 | 9/2004 | Dabak et al. | |
| 2006/0072524 A1 | 4/2006 | Perahia et al. | |
| 2006/0221920 A1 | 10/2006 | Gopalakrishnan et al. | |
| 2006/0291544 A1 | 12/2006 | Fischer et al. | |
| 2007/0046539 A1 | 3/2007 | Mani et al. | |
| 2007/0047666 A1 | 3/2007 | Trachewsky | |
| 2007/0054633 A1 | 3/2007 | Piirainen | |
| 2007/0121751 A1 | 5/2007 | Li et al. | |

(Continued)

OTHER PUBLICATIONS

IEEE Std 802.11™—2007 (Revision of IEEE STD 802.11—1999) IEEE Standard for Information technology—Telecommunications and information exchange between systems—Local and metropolitan area networks—Specific requirements. Part 11: Wireless LAN Medium Access Control (MAC) and Physical Layer (PHY) Specifications, 1232 pages (Continued)

*Primary Examiner* — Hassan Phillips
*Assistant Examiner* — Prenell Jones
(74) *Attorney, Agent, or Firm* — Shichrur & Co.

(57) ABSTRACT

Some demonstrative embodiments include devices, systems and/or methods of indicating station-specific information within a wireless communication. For example, a device may include a wireless communication unit to transmit a wireless communication frame to a plurality of stations using a respective plurality of beamforming configurations, wherein the wireless communication unit is to transmit to the stations beamforming configuration information including station-specific information corresponding to the plurality of beamforming configurations, respectively.

22 Claims, 4 Drawing Sheets

(56) References Cited

U.S. PATENT DOCUMENTS

| | | |
|---|---|---|
| 2007/0195811 A1 | 8/2007 | Basson et al. |
| 2007/0253501 A1 | 11/2007 | Yamaura |
| 2007/0254608 A1 | 11/2007 | Bougard |
| 2007/0258348 A1 | 11/2007 | Matsuda et al. |
| 2008/0012764 A1 | 1/2008 | Kang et al. |
| 2008/0039046 A1 | 2/2008 | Vilzmann et al. |
| 2008/0137585 A1 | 6/2008 | Loyola et al. |
| 2008/0285524 A1 | 11/2008 | Yokoyama |
| 2009/0015665 A1 | 1/2009 | Willsie |
| 2009/0051592 A1 | 2/2009 | Lee et al. |
| 2009/0054093 A1 | 2/2009 | Kim et al. |
| 2009/0189812 A1 | 7/2009 | Xia et al. |
| 2009/0201861 A1 | 8/2009 | Kotecha |
| 2009/0201884 A1 | 8/2009 | Chaponniere |
| 2009/0232106 A1 | 9/2009 | Cordeiro et al. |
| 2009/0296788 A1 | 12/2009 | Hottinen |
| 2009/0325585 A1 | 12/2009 | Farajidana et al. |
| 2010/0056059 A1 | 3/2010 | Lakshmanan et al. |
| 2010/0111215 A1 | 5/2010 | Nandagopalan et al. |
| 2010/0118835 A1 | 5/2010 | Lakkis et al. |
| 2010/0150013 A1 | 6/2010 | Hara et al. |
| 2010/0157955 A1 | 6/2010 | Liu et al. |
| 2010/0172425 A1 | 7/2010 | Pare, Jr. et al. |
| 2010/0177719 A1 | 7/2010 | Shao et al. |
| 2010/0177746 A1 | 7/2010 | Gorokhov et al. |
| 2010/0220798 A1 | 9/2010 | Trachewsky |
| 2010/0238824 A1 | 9/2010 | Farajidana et al. |
| 2010/0254476 A1 | 10/2010 | Li et al. |
| 2010/0265895 A1 | 10/2010 | Bracha |
| 2010/0271992 A1 | 10/2010 | Wentink et al. |
| 2010/0284446 A1 | 11/2010 | Mu et al. |
| 2010/0290449 A1 | 11/2010 | Van Nee et al. |
| 2010/0291917 A1 | 11/2010 | Wang et al. |
| 2011/0002219 A1* | 1/2011 | Kim et al. ............. 370/203 |
| 2011/0026459 A1 | 2/2011 | Tsai et al. |
| 2011/0032893 A1 | 2/2011 | Li et al. |
| 2011/0034192 A1 | 2/2011 | Lim et al. |
| 2011/0044303 A1 | 2/2011 | Ji et al. |
| 2011/0110454 A1* | 5/2011 | Sampath et al. ............. 375/295 |
| 2011/0143692 A1 | 6/2011 | Sofer et al. |
| 2011/0149842 A1 | 6/2011 | Cordeiro |
| 2011/0150004 A1 | 6/2011 | Denteneer et al. |
| 2011/0194475 A1* | 8/2011 | Kim et al. ............. 370/311 |
| 2011/0211487 A1 | 9/2011 | Han et al. |
| 2011/0299379 A1 | 12/2011 | Sesia et al. |
| 2012/0076039 A1 | 3/2012 | Kwon et al. |
| 2012/0115497 A1 | 5/2012 | Tolli et al. |
| 2014/0078966 A1* | 3/2014 | Erceg et al. ............. 370/328 |
| 2014/0126450 A1* | 5/2014 | Kim et al. ............. 370/311 |

OTHER PUBLICATIONS

Office Action for U.S. Appl. No. 12/772,259, mailed on Oct. 12, 2012, 19 pages.

Office Action for U.S. Appl. No. 12/772,259, mailed on Apr. 18, 2013, 16 pages.

Office Action for U.S. Appl. No. 12/772,259, mailed on Dec. 5, 2013, 14 pages.

* cited by examiner

DEVICE, SYSTEM AND METHOD OF INDICATING STATION-SPECIFIC INFORMATION WITHIN A WIRELESS COMMUNICATION

CROSS REFERENCE

This application is a Continuation application of U.S. patent application Ser. No. 12/772,259, filed May 3, 2010, the entire disclosure of which is incorporated herein by reference.

BACKGROUND

A wireless communication device, for example, an Access Point (AP), may implement a Space Division Multiple Access (SDMA) mechanism to transmit a multi-user Multiple Input Multiple Output (MIMO) wireless frame including a plurality of MIMO frames to be simultaneously received by a plurality of wireless communication stations.

The multi-user MIMO frame may include a non-beamformed portion and beamformed portion. The non-beamformed portion may include any suitable training symbols and/or signaling fields, which may also be received by other stations. The beamformed portion may be transmitted to the plurality of stations using a respective plurality of beamforming configurations.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
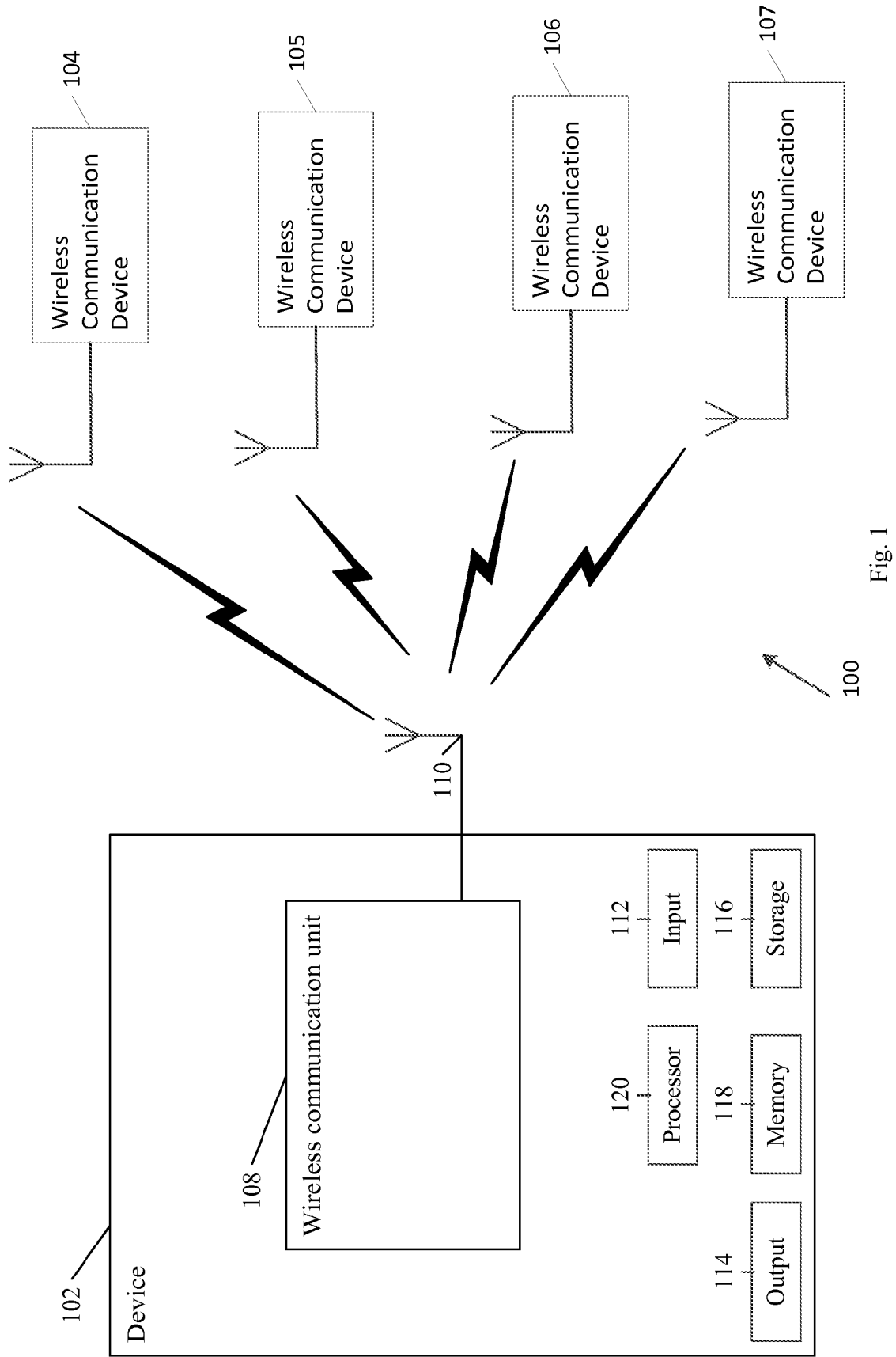
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Personal Area Network (PAN), a Wireless PAN (WPAN), devices and/or networks operating in accordance with existing IEEE 802.11 (IEEE 802.11-1999: Wireless LAN Medium Access Control (MAC) and Physical Layer (PHY) Specifications), 802.11a, 802.11b, 802.11g, 802.11h, 802.11j, 802.11n, 802.16, 802.16d, 802.16e, 802.16f, standards ("the IEEE 802 standards") and/or future versions and/or derivatives thereof, devices and/or networks operating in accordance with existing Wireless-Gigabit-Alliance (WGA) and/or WirelessHD™ specifications and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

Some demonstrative embodiments may be used in conjunction with suitable limited-range or short-range wireless communication networks, for example, a wireless area network, a "piconet", a WPAN, a WVAN and the like.

Reference is now made to FIG. 1, which schematically illustrates a block diagram of a system 100 in accordance with some demonstrative embodiments.

In some demonstrative embodiments, one or more elements of system 100 may be capable of communicating content, data, information and/or signals over one or more suitable wireless communication links, for example, a radio channel, an IR channel, a RF channel, a Wireless Fidelity (WiFi) channel, and the like. One or more elements of system 100 may optionally be capable of communicating over any suitable wired communication links.

As shown in FIG. 1, in some demonstrative embodiments, system 100 may include two or more devices, e.g., wireless communication devices 102, 104, 105, 106 and 107, which communicate in a wireless manner to transfer data. In one example, device 102 may perform the functionality of an Access Point (AP) and/or devices 104, 105, 106 and/or 107 may perform the functionality of a wireless communication station ("station"), e.g., as defined by the IEEE 802 standards, and the like.

In some demonstrative embodiments, at least one of device 102, 104, 105, 106 and 107, e.g., device 102, may include a wireless communication unit 108 capable of transmitting and/or receiving wireless communication transmissions to and/or from one or more other devices of system 100.

In some demonstrative embodiments, one or more of wireless communication devices 102, 104, 105, 106 and 107 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, one or more of wireless communication devices 102, 104, 105, 106 and 107 may include, for example, one or more of a processor 120, an input unit 112, an output unit 114, a memory unit 118, and a storage unit 116. Devices 102, 104, 105, 106 and 107 may optionally include other suitable hardware components and/or software components. In some demonstrative embodiments, some or all of the components of device 102 may be enclosed in a common housing or packaging, and may be interconnected or operably associated using one or more wired or wireless links. In other embodiments, components of device 102 may be distributed among multiple or separate devices or locations.

Processor 120 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 120 executes instructions, for example, of an Operating System (OS) of device 102, and/or of one or more suitable applications.

Input unit 112 includes, for example, a keyboard, a keypad, a mouse, a touch-pad, a track-ball, a stylus, a microphone, or other suitable pointing device or input device. Output unit 114 includes, for example, a monitor, a screen, a flat panel display, a Cathode Ray Tube (CRT) display, a Liquid Crystal Display (LCD), an LED display, a plasma display unit, one or more audio speakers or earphones, or other suitable output devices.

Memory unit 118 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 116 includes, for example, a hard disk drive, a floppy disk drive, a Compact Disk (CD) drive, a CD-ROM drive, a DVD drive, or other suitable removable or non-removable storage units. Memory unit 118 and/or storage unit 116, for example, store data processed by device 102.

In some demonstrative embodiments, wireless communication unit 108 includes or may be part of, for example, one or more wireless transmitters, receivers and/or transceivers able to send and/or receive wireless communication signals, RF signals, frames, blocks, transmission streams, packets, messages, specific data items, and/or any other type of communication data. For example, wireless communication unit 108 may include or may be implemented as part of a suitable wireless communication unit, for example, a suitable wireless Network Interface Card (NIC), and the like.

In some demonstrative embodiments, wireless communication unit 108 may include, or may be associated with, one or more antennas and/or one or more sets of antennas 110. Antennas 110 may include, for example, an internal and/or external RF antenna, a dipole antenna, a monopole antenna, an omni-directional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data.

In some demonstrative embodiments, wireless communication device 102 may transmit a multi-user MIMO frame to a plurality of stations ("client stations"), e.g., two or more of devices 104, 105, 106 and/or 107 including MIMO frames to be received by the plurality of client stations, e.g., simultaneously. For example, device 102 may transmit the multi-user MIMO frame according to any suitable Space-Division Multiple Access (SDMA) scheme.

In some demonstrative embodiments, the multi-user MIMO frame may include a beamformed portion and a non-beamformed portion, e.g., as described below with reference to FIGS. 3 and/or 4.

In some demonstrative embodiments, the non-beamformed portion may include any suitable information, e.g., training symbols and/or signaling fields, which may also be received by one or more stations other than the plurality of client stations. The beamformed portion may be transmitted by device 102 to the plurality of client stations using a respective plurality of beamforming configurations.

In some demonstrative embodiments, wireless communication unit 108 may provide the plurality of client stations with Beamforming Configuration Information (BCI) corresponding to the plurality of beamforming configurations, e.g., to enable the plurality of stations to properly receive the beamformed part of the multi-user MIMO frame, e.g., as described in detail below.

In some demonstrative embodiments, the BCI may include station-specific beamforming information indicating and/or defining to the plurality of stations the plurality of beamforming configurations. For example, the BCI may indicate to a station of the plurality of stations a location within the beamformed part, e.g., within a preamble of the beamformed portion, of station-specific information corresponding to the station. The BCI may indicate to the station, for example, a number of beamforming streams to be used by the station for receiving the beamformed portion, a number of training fields to be used by the station, and the like, e.g., as described below.

In some demonstrative embodiments, wireless communication unit 108 may transmit the BCI as part of the multi-user MIMO frame, for example, as part of the non-beamformed portion of the multi-user MIMO frame, e.g., as described below with reference to FIGS. 3 and/or 5.

In some demonstrative embodiments, wireless communication unit 108 may transmit the BCI separately from the multi-user MIMO frame, for example, prior to transmitting the multi-user MIMO frame, e.g., as described below with reference to FIGS. 4 and/or 6.

Figure 2:
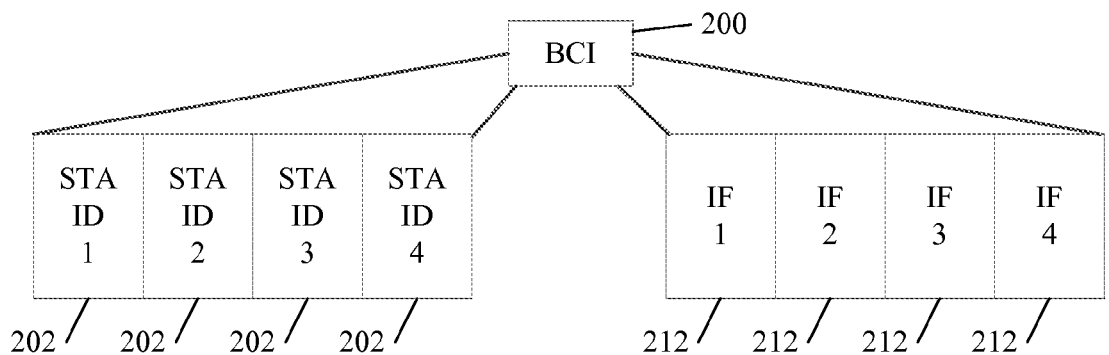
FIG. 2 is a schematic illustration of a beamforming-configuration-information (BCI) scheme, in accordance with some demonstrative embodiments.

Reference is now made to FIG. 2, which schematically illustrates a beamforming configuration information (BCI) scheme 200, in accordance with some demonstrative embodiments.

In some demonstrative embodiments, BCI 200 may be transmitted by a wireless communication device, e.g., device 102 (FIG. 1), to a plurality of stations, e.g., stations 104, 105, 106 and/or 107, to indicate to the plurality of wireless communication devices a plurality of beamforming configurations to be used for transmitting beamformed transmissions to the plurality of stations.

In some demonstrative embodiments, BCI 200 may include a plurality of station identifiers ("STAIDs") 202 (also referred to herein as "address fields"), identifying the plurality of stations, respectively. Station identifiers 202 may include any suitable value, e.g., in the form of a suitable station ID, a unicast address, a Media-Access-Control (MAC) address, and the like. Station identifiers 202 may include any suitable number of bytes, e.g., two bytes. For example, station identifiers 202 may include four station identifiers, denoted STAID1, STAID2, STAID3, and STAID4, identifying four respective client stations. In one example, STAID1 may include two bytes identifying an address of station 105 (FIG. 1), STAID2 may include two bytes identifying an address of station 104 (FIG. 1), STAID3 may include two bytes identifying an address of station 107 (FIG. 1) and/or STAID4 may include two bytes identifying an address of station 106 (FIG. 1).

In some demonstrative embodiments, BCI 200 may include a plurality of information fields (IFs) 212 including station-specific information corresponding to the plurality of beamforming configurations, respectively. For example, the plurality of information fields 212 may include station-specific information corresponding to the plurality of stations, respectively.

In some demonstrative embodiments, information fields 212 may be arranged according to an order of station identifiers 202. For example, information fields 212 may include four fields, denoted IF1, IF2, IF3 and IF4, including station-specific information corresponding to the stations identified by the station identifiers STAID1, STAID2, STAID3 and STAID4, respectively. In one example, station identifiers STAID1, STAID2, STAID3 and STAID 4 may identify stations 105, 104, 107 and 106, respectively; and information fields IF1, IF2, IF3 and IF4 may include station-specific information corresponding to stations 105, 104, 107 and 106, respectively.

In some demonstrative embodiments, an information field of information fields 212, corresponding to station identified by a respective identifier of identifiers 202, may include, for example, a number of training fields (TFs) and/or a number of transmission streams to be received by the station as part of a beamformed transmission, e.g., as described in detail below. In one example, the IF may include the number of transmission streams and the station may determine, for example, the number of TFs based on the number of the transmission streams. In other embodiments, the information field may include any alternative and/or additional information indicating and/or defining the beamforming configuration corresponding to the station. For example, a number of training fields (TFs) and/or a number of transmission streams to be received by the station as part of a beamformed transmission.

In some demonstrative embodiments, BCI 200 may enable the plurality of stations to properly receive a beamformed portion of a multi-user MIMO frame, e.g., a downlink multi-user MIMO frame from device 102 (FIG. 1). For example, a station of the plurality of stations receiving BCI 200 may determine an IF 212 directed to the station based, for example, on station identifiers 202. For example, the station may compare the content of station identifiers 202 with the station ID of the station and, if a match is detected, the station may locate a corresponding information field of information fields 212, for example, based on a relative location of the detected identifier 202 within station identifiers 202. In one example, if station 106 (FIG. 1) detects that a fourth station identifier, e.g., STAID4, of identifiers 202 includes the address of station 106 (FIG. 1), station 106 (FIG. 1) may use the station-specific information included in a fourth IF of IFs 212, e.g., IF4, in order to determine a beamforming configuration to be used by station 106 (FIG. 1) for receiving the beamformed portion. In one example, an IF of IFs 212 may indicate one or more training fields to be received by a respective station of the plurality of client stations. Accordingly, station 106 (FIG. 1) may use the IFs preceding IF4, e.g., IF1, IF2 and IF3, to determine a umber of training fields ("the preceding training fields") to be used by the stations corresponding to the preceding IFs 212; and to determine the training fields to be used by station 106 (FIG. 1) to include the number of training fields indicated by IF4, and which are successive to the preceding training fields. For example, a multi-user MIMO frame may include nine training fields, station identifiers STAID1, STAID2, STAID3 and STAID 4 identify stations 105, 104, 107 and 106, respectively, and information fields IF1, IF2, IF3 and IF4 indicate the numbers 2, 2, 2, and 3. Accordingly, station 106 (FIG. 1) may determine that three other stations are to use the first six training fields, and that station 106 (FIG. 1) is to use the seventh, eighth and ninth training fields.

Figure 3:
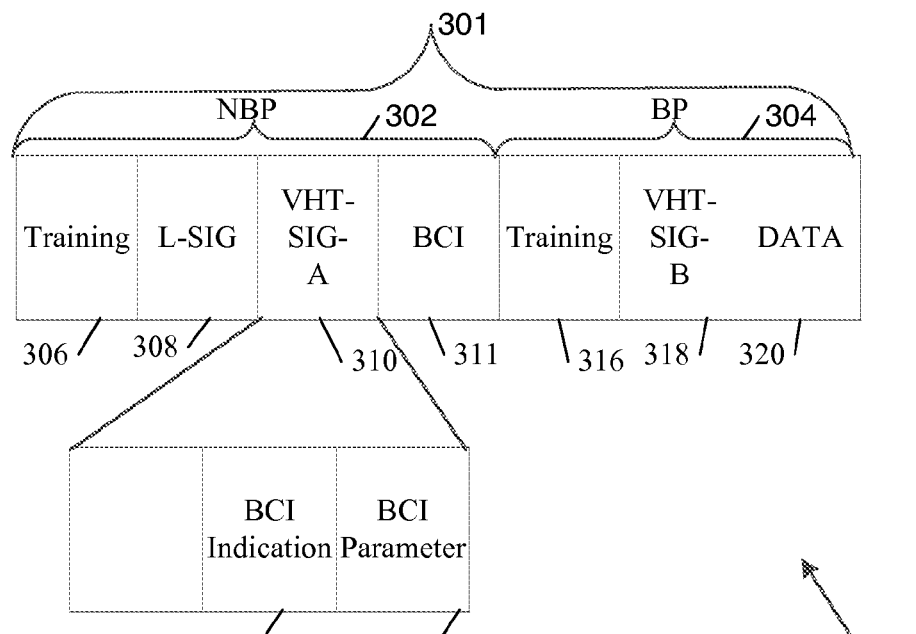
FIG. 3 is a schematic illustration of a wireless communication scheme including BCI, in accordance with one demonstrative embodiment.

Reference is now made to FIG. 3, which schematically illustrates a wireless communication scheme 300 including BCI, in accordance with one demonstrative embodiment. In some demonstrative embodiments, wireless communication scheme 300 may be implemented by one or more devices of a wireless communication system, e.g., system 100, to enable a wireless communication device, e.g., device 102 (FIG. 1), to provide the BCI to a plurality of stations, e.g., stations 104, 105, 106 and/or 107 (FIG. 1) intended to receive a multi-user MIMO frame 301. Scheme 300 may be implemented to provide the BCI information as part of MIMO frame 301, e.g., as described below.

In some demonstrative embodiments, frame 301 may include a non-beamformed portion (NBP) 302 followed by a beamformed portion (BP) 304.

In some demonstrative embodiments, unit 108 (FIG. 1) may transmit BP 304 to the plurality of stations using a respective plurality of beamforming configurations.

In some demonstrative embodiments, BP 304 may include one or more suitable training fields 316, one or more Very-High-Throughput Signal-B (VHT-SIG-B) fields 318, one or more of data fields 320, and/or any other suitable fields. For example, BP 304 may include information in accordance with the IEEE 802 standards and/or any other suitable standard and/or protocol.

In some demonstrative embodiments, training fields 316 may include a plurality of suitable training sequences to be used, e.g., as part of a training session for receiving BP 304. For example, training fields 316 may include a plurality of fields including one or more training fields to be used by each of stations 104, 105, 106 and/or 107 (FIG. 1). For example, training fields 316 may include training sequences in accordance with the IEEE 802.11 standards and/or any other suitable standard and/or protocol.

In some demonstrative embodiments, VHT-SIG-B 318 may include suitable signaling information, e.g., in the form of information parameters, to indicate one or more transmission characteristics of data fields 320. For example, VHT-SIG-B 318 may include Modulation and Coding Scheme (MCS) information, coding type information, e.g., convolutional encoder/LDPC and/or the actual length of data field 320 in bytes, and the like. For example, VHT-SIG-B 318 may include signaling information in accordance with the IEEE 802 standards and/or any other suitable standard and/or protocol.

In some demonstrative embodiments, NBP 302 may include BCI 311 corresponding to the plurality of beamforming configurations. BCI 311 may include, for example, the STAIDs 202 and Ifs 212 of BCI 200 (FIG. 2).

In some demonstrative embodiments, NBP 320 may include one or more training fields 306, one or more Legacy Signal (L-SIG) fields 308 and/or one or more of Very-High-Throughput Signal-A (VHT-SIG-A) 310 fields.

In some demonstrative embodiments, training fields 306 may include suitable training sequences to enable reception of NBP 302, e.g., in accordance with the IEEE 802 standards and/or any other suitable standard and/or protocol.

In some demonstrative embodiments, L-SIG 308 may include suitable signaling information, for example, in the form of information parameters, to indicate one or more transmission characteristics of NBP 302, e.g., in accordance with the IEEE 802 standards and/or any other suitable standard and/or protocol. For example, L-SIG 308 may include a MCS of NBP 302.

In some demonstrative embodiments, VHT-SIG-A 310 may include suitable signaling information corresponding to BP 304, for example, a length and/or duration of BP 304, e.g., in accordance with the IEEE 802 standards and/or any other suitable standard and/or protocol.

In some demonstrative embodiments, BCI 311 may be included as part of field 310 and/or as part of any other field of NBP 304.

In other embodiments, BCI 311 may be included as part of a separate field of NBP 302, e.g., as described below.

In some demonstrative embodiments, VHT-SIG-A 310 may include a BCI indication field 312 to indicate whether or not NBP 304 includes BCI 311. For example, indication field 312 may include a single bit having a first value, e.g., zero, to indicate that NBP 304 does not include BCI 311, or a second value, e.g., one, to indicate that NBP 304 includes BCI 311.

In some demonstrative embodiments, BCI 311 may be transmitted using one or more transmission characteristics different from transmission characteristics of one or more other fields of NBP 302. For example, BCI 310 may be transmitted using a MCS different from an MCS of one or more other fields of NBP 302, e.g., an MCS of field 310.

In some demonstrative embodiments, field 310 may include one or more BCI transmission parameters 314 indicating one or more transmission characteristics of BCI 311. For example, field 310 may include a BCI parameter filed 314 including, for example, an MCS of BCI 311. In one example, fields 312 and 314 may be relatively short, for example, requiring only three bits corresponding to BCI 311, e.g., one bit for field 312 and two bits for MCS field 314. In other embodiments, fields 312 and/or 314 may include any other suitable length.

In some demonstrative embodiments, field 310 may be transmitted at a relatively low rate. Accordingly, BCI 311 may be included as part of field 310, for example, if BCI 311 is relatively short, e.g., if BCI 311 includes information relating to a relatively small number of stations. BCI 311 may be transmitted separately from field 310, using a relatively high transmission rate, for example, if BCI 311 is relatively long, e.g., if BCI 311 includes information relating to a relatively large number of stations. The transmission rate of BCI 311 may be indicated, for example, by MCS field 314.

In some demonstrative embodiments, when unit 108 (FIG. 1) transmits BCI 200 (FIG. 2) as a part of NBP 302, e.g., as part of field 310, the preamble structure of multi-user MIMO frame 300 may be similar to a structure of a single user (SU) MIMO wireless communication frame, e.g., which may include suitable VHT-SIG-A, training and/or VHT-SIG-B fields.

Figure 4:
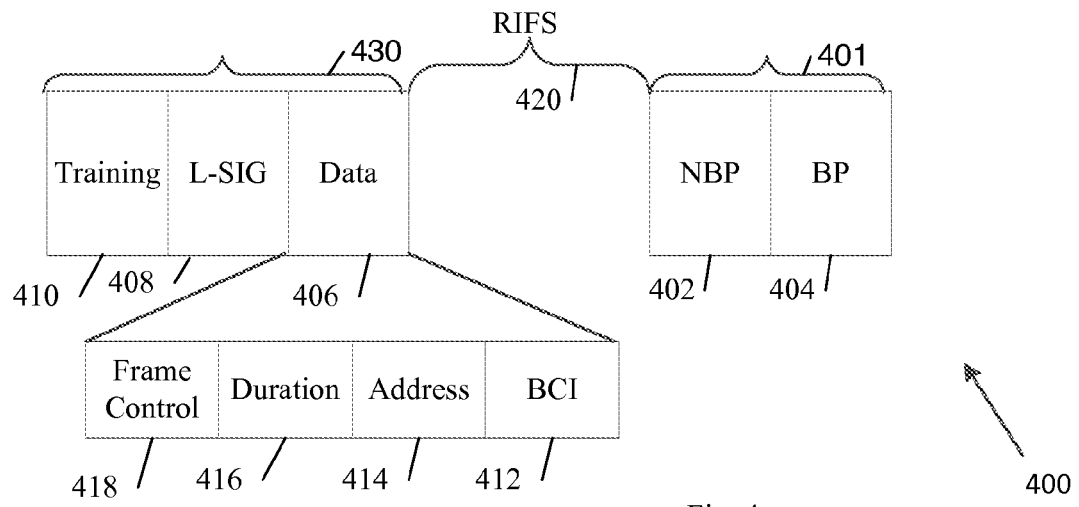
FIG. 4 is a schematic illustration of a wireless communication scheme including BCI, in accordance with another demonstrative embodiment.

Reference is now made to FIG. 4, which schematically illustrates a wireless communication scheme 400, in accordance with another demonstrative embodiment.

In some demonstrative embodiments, wireless communication scheme 400 may be implemented by one or more devices of a wireless communication system, e.g., system 100 (FIG. 1), to enable a wireless communication device, e.g., device 102 (FIG. 1), to provide BCI to a plurality of stations, e.g., stations 104, 105, 106 and/or 107 (FIG. 1), intended to receive a multi-user MIMO frame 401. Scheme 400 may be implemented, for example, to provide the BCI separately from multi-user MIMO frame 401, e.g., as described below.

In some demonstrative embodiments, multi-user MIMO frame 401 may include a non-beamformed portion (NBP) 402 followed by a beamformed portion (BP) 404, e.g., in accordance with the IEEE 802 standards and/or any other suitable standard and/or protocol. For example, NBP 402 may include NBP 302 (FIG. 3) and/or BP 404, may include fields 302, 308, and/or 310 (FIG. 3), as described above.

In some demonstrative embodiments, wireless communication scheme 400 may include a BCI frame 430, which may be transmitted, e.g., by device 102 (FIG. 1), prior to the transmission of frame 401.

In some demonstrative embodiments, BCI frame 430 may be transmitted a Reduced Inter-Frame Spacing (RIFS) 420 prior to frame 401. For example, in order to prevent other stations from intervening, e.g., by transmitting transmissions to device 102 (FIG. 1) and/or to other stations of system 100 (FIG. 1), between the transmission of frame 430 and the transmission of multi-user MIMO frame 401.

In some demonstrative embodiments, unit 108 (FIG. 1) may transmit BP 404 of multi-user MIMO frame 401 to the plurality of stations using a respective plurality of beamforming configurations.

In some demonstrative embodiments, BCI frame 430 may include BCI 412 corresponding to the plurality of beamforming configurations used by multi-user MIMO frame 401. BCI 412 may include, for example, the STAIDs 202 and Ifs 212 of BCI 200 (FIG. 2).

In some demonstrative embodiments, BCI frame 430 may include one or more training fields 410, L-SIG fields 408 and/or data fields 406.

In some demonstrative embodiments, training field 410 may include suitable training sequences to enable reception of frame 430, e.g., in accordance with the IEEE 802 standards and/or any other suitable standard and/or protocol.

In some demonstrative embodiments, L-SIG 408 may include suitable signaling information, for example, in the form of information parameters, to indicate one or more transmission characteristics of frame 430, e.g., in accordance with the IEEE 802 standards and/or any other suitable standard and/or protocol. For example, L-SIG 308 may include a MCS of frame 430.

In some demonstrative embodiments, data field 406 may include BCI 412.

In some demonstrative embodiments, data field 406 may also include a frame control field 418, a duration field 416, and/or and address field 414. Frame control field 418 may include frame type and/or control information relating to frame 430; duration filed 416 may include information regarding the duration of frame 430; and/or address field 414 may include an indication of one or more addresses of devices intended to receive frame 430, for example, a broadcast MAC address, a multicast MAC address, and the like. For example, fields 418, 416 and/or 414 may include information in accordance with the IEEE 802 standards and/or any other suitable standard and/or protocol.

In some demonstrative embodiments, frame 430 and/or BCI 412 may be transmitted using one or more transmission characteristics different from transmission characteristics of one or more other fields of multi-user MIMO frame 401. For example, frame 430 and/or BCI 412 may be transmitted using a MCS different from an MCS of one or more other fields of multi-user MIMO frame 401.

Figure 5:
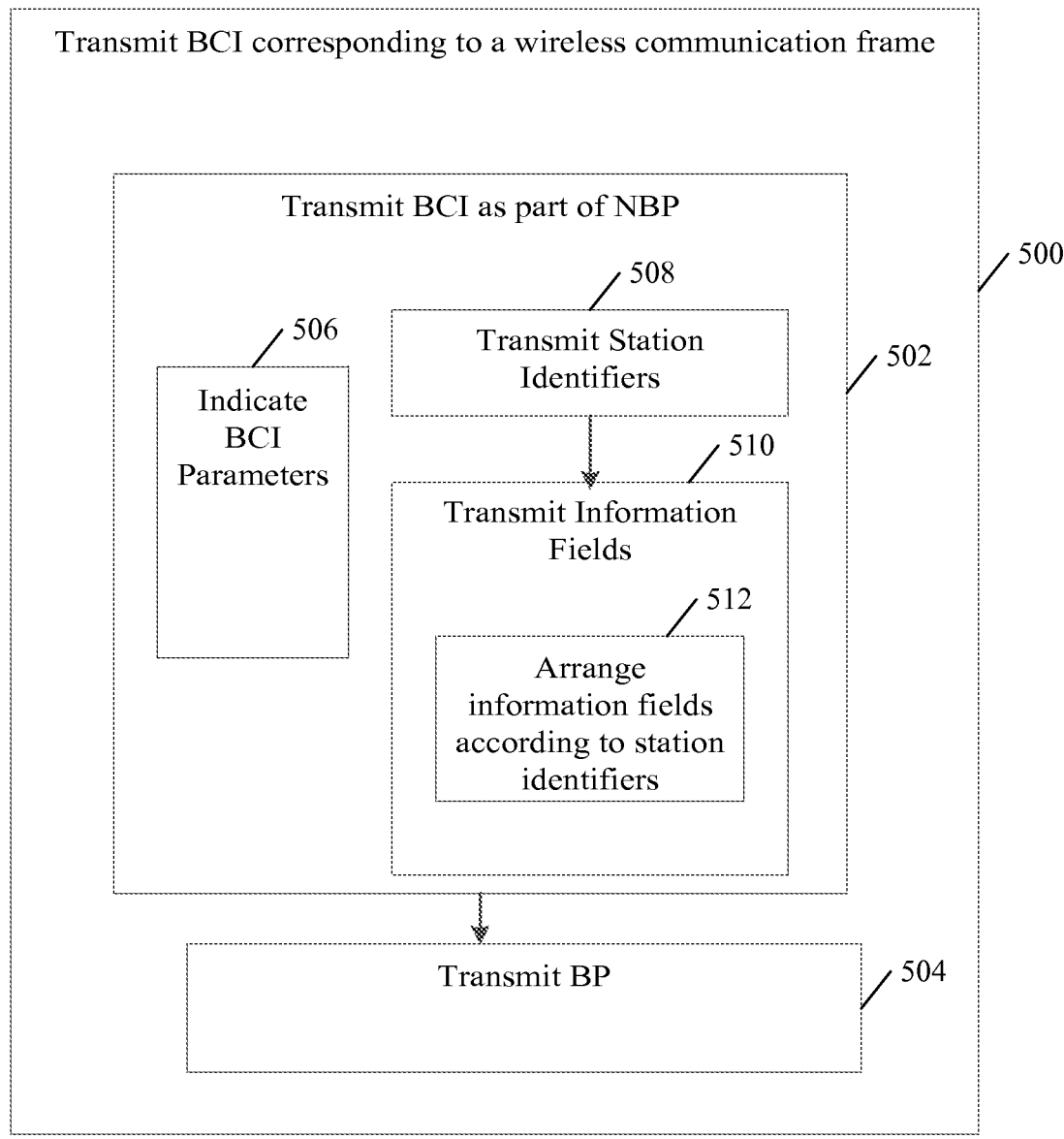
FIG. 5 is a schematic flow-chart illustration of a method of indicating station-specific beamforming information, in accordance with one demonstrative embodiment.

Reference is now made to FIG. 5, which schematically illustrates a method of indicating station-specific beamforming information, in accordance with one demonstrative embodiment.

In some demonstrative embodiments, one or more of the operations of the method of FIG. 5 may be performed by one or more elements of a wireless communication system, e.g., system 100 (FIG. 1), for example, a wireless communication device, e.g., wireless communication device 102 (FIG. 1), a wireless communication unit, e.g., wireless communication unit 108 (FIG. 1), and/or any other wireless communication device capable of receiving and/or transmitting wireless communication frames.

As indicated in block 500, the method may include transmitting BCI corresponding to a wireless communication frame, which is transmitted to a plurality of stations. For example, wireless communication unit 108 (FIG. 1) may transmit BCI 200 (FIG. 2) to a plurality of client stations, e.g., devices 104, 105, 106 and/or 107 (FIG. 1).

In some demonstrative embodiments, the wireless communication frame may include a non-beamformed portion (NBP) followed by a beamformed portion (BP). For example, the wireless communication frame may include a multi-user MIMO frame, e.g., as described above with reference to FIGS. 3 and/or 4. The BP may be transmitted to a plurality of client stations using a respective plurality of beamforming configurations, e.g., as described above.

As indicated in block 502, transmitting the BCI may include transmitting the BCI as a part of the NBP of the wireless communication frame. For example, wireless communication unit 108 (FIG. 1) may transmit BCI 311 (FIG. 3) as part of NBP 302 (FIG. 3), as described above.

As indicated at block 504, the method may include transmitting the BP, e.g., after transmitting the NBP. For example, wireless communication unit 108 (FIG. 1) may transmit BO 304 (FIG. 3).

In some demonstrative embodiments, the BCI may be transmitted using one or more transmission characteristics different from transmission characteristics of the NBP. For example, the BCI may be transmitted using a MCS different from the MCS of the NBP.

As indicated in block 506, transmitting the BCI may include indicating one or more BCI parameters indicating one or more transmission characteristics of the BCI. For example, wireless communication unit 108 (FIG. 1) may transmit BCI parameters 314 (FIG. 3), e.g., as described above.

As indicated in block 508, transmitting the BCI may include transmitting a plurality of station identifiers identifying the plurality of stations, respectively. For example, wireless communication unit 108 (FIG. 1) may transmit station identifiers 202 (FIG. 2), e.g., as described above.

As indicated in block 510, transmitting the BCI may include transmitting a plurality of information fields corresponding to the plurality of stations, respectively. The plurality of information fields may include, for example, station-specific information corresponding to the plurality of beamforming configurations, respectively. For example, wireless communication unit 108 (FIG. 1) may transmit IFs 212 (FIG. 2), e.g., as described above.

As indicated in block 512, transmitting the plurality of information fields may include transmitting the plurality of information fields arranged according to an order of the plurality of station identifiers. For example, wireless communication unit 108 (FIG. 1) may arrange fields 202 and 212 (FIG. 2) such that an order of station identifiers 202 (FIG. 2) may indicate an order of the stations corresponding to IFs 212, e.g., as described above.

Figure 6:
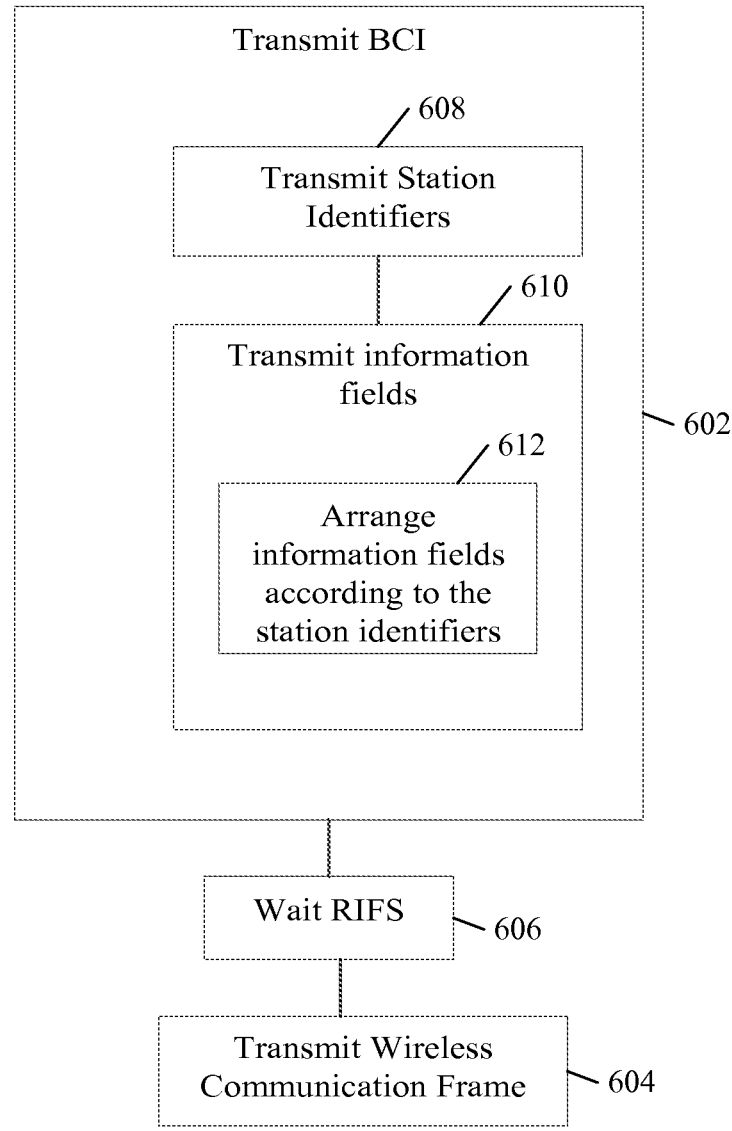
FIG. 6 is a schematic flow-chart illustration of a method of indicating station-specific beamforming information, in accordance with another demonstrative embodiment.

Reference is now made to FIG. 6, which schematically illustrates a method of indicating station-specific beamforming information, in accordance with another demonstrative embodiment.

In some demonstrative embodiments, one or more of the operations of the method of FIG. 6 may be performed by one or more elements of a wireless communication system, e.g., system 100 (FIG. 1), for example, a wireless communication device, e.g., wireless communication device 102 (FIG. 1), a wireless communication unit, e.g., wireless communication unit 108 (FIG. 1), and/or any other wireless communication device capable of receiving and/or transmitting wireless communication frames.

As indicated in block 602, the method may include transmitting BCI corresponding to a wireless communication frame, which is transmitted to a plurality of stations. For example, wireless communication unit 108 (FIG. 1) may transmit BCI 200 (FIG. 2) to a plurality of client stations, e.g., devices 104, 105, 106 and/or 107 (FIG. 1).

As indicated at block 604, method may include transmitting the wireless communication frame after transmitting the BCI. The wireless communication frame may include a non-beamformed portion (NBP) followed by a beamformed portion (BP). For example, the wireless communication frame may include a multi-user MIMO frame, e.g., as described above with reference to FIGS. 3 and/or 4. The BP may be transmitted to a plurality of client stations using a respective plurality of beamforming configurations, and the BCI may include information corresponding to the plurality of beamforming configurations, e.g., as described above.

As indicated at block 606, the method may include transmitting the BCI a RIFS period prior to transmitting the wireless communication frame. For example, wireless communication unit 108 (FIG. 1) may transmit BCI frame 430 (FIG. 4) to a plurality of client stations, e.g., devices 104, 105, 106 and/or 107 (FIG. 1), and wait a RIFS prior to transmitting frame 401 (FIG. 4), e.g., as described above.

As indicated in block 608, transmitting the BCI may include transmitting a plurality of station identifiers identifying the plurality of stations, respectively. For example, wireless communication unit 108 (FIG. 1) may transmit station identifiers 202 (FIG. 2), e.g., as described above.

As indicated in block 610, transmitting the BCI may include transmitting a plurality of information fields corresponding to the plurality of stations, respectively. The plurality of information fields may include, for example, station-specific information corresponding to the plurality of beamforming configurations, respectively. For example, wireless communication unit 108 (FIG. 1) may transmit IFs 212 (FIG. 2), e.g., as described above.

As indicated in block 612, transmitting the plurality of information fields may include transmitting the plurality of information fields arranged according to an order of the plurality of station identifiers. For example, wireless communication unit 108 (FIG. 1) may arrange fields 202 and 212 (FIG. 2) such that an order of station identifiers 202 (FIG. 2) may indicate an order of the stations corresponding to IFs 212, e.g., as described above.

Figure 7:
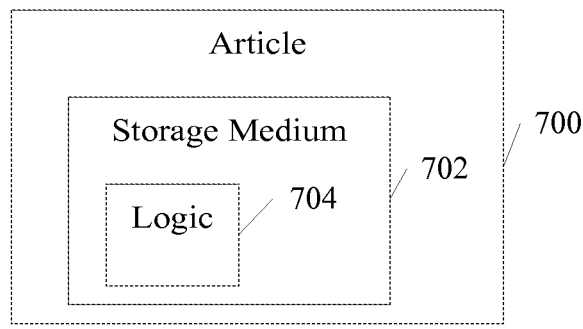
FIG. 7 is a schematic illustration of an article of manufacture, in accordance with some demonstrative embodiments.

Reference is made to FIG. 7, which schematically illustrates an article of manufacture 700, in accordance with some demonstrative embodiments. Article 700 may include a machine-readable storage medium 702 to store logic 704, which may be used, for example, to perform at least part of the functionality of unit 108 (FIG. 1) and/or wireless communication device 102 (FIG. 1); and/or to perform one or more operations of the method of FIGS. 5 and/or 6.

In some demonstrative embodiments, article 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EE-PROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless communication device including one or more processors having circuitry and logic to:
   process a signal field of a downlink multi-user (MU) Multi-Input-Multi-Output (MU-MIMO) transmission from an Access Point (AP), said signal field comprises a Very High Throuput Signal A (VHT-SIG-A) field, the signal field including a first field to identify a plurality of users, and a second field including a plurality of numbers of streams, each number of streams corresponding to a respective one of said plurality of users, said first field indicating locations of the plurality of numbers of streams in the second field;
   based on said first field, determine from said plurality of numbers of streams a number of streams corresponding to said wireless communication device; and
   receive a data field of said MU-MIMO transmission using the number of streams corresponding to said wireless communication device.

2. The wireless communication device of claim 1, wherein the first field indicates an order of said plurality of numbers of streams in said second field.

3. The wireless communication device of claim 1, wherein said second field includes four numbers of streams corresponding to four users, respectively.

4. The wireless communication device of claim 1 further including one or more antennas, and a memory.

5. A wireless communication device comprising:
   a transmitter to transmit a downlink multi-user (MU) Multi-Input-Multi-Output (MU-MIMO) transmission to a plurality of users, the downlink MU-MIMO transmission including:
      a signal field including a first field to identify the plurality of users, and a second field including a plurality of numbers of streams, each number of streams corresponding to a respective one of said plurality of users, said first field indicating locations of the plurality of numbers of streams in the second field, the signal field comprises a Very High Throughput Signal A (VHT-SIG-A) field; and a data field.

6. The wireless communication device of claim 5, wherein the first field indicates an order of said plurality of numbers of streams in said second field.

7. The wireless communication device of claim 5, wherein the data field is a beamformed data field.

8. The wireless communication device of claim 5, wherein the data field is configured according to the plurality of numbers of streams.

9. The wireless communication device of claim 5, wherein said plurality of users includes four users, the second field including four numbers of streams corresponding to said four users, respectively.

10. The wireless communication device of claim 5 being an Access Point (AP).

11. The wireless communication device of claim 5 further including one or more antennas, and a memory.

12. A product including one or more tangible computer-readable non-transitory storage media comprising computer-executable instructions operable to, when executed by at least one computer processor, enable the at least one computer processor to implement one or more operations at a wireless communication station (STA), the operations comprising:
   receiving a signal field of a downlink multi-user (MU) Multi-Input-Multi-Output (MU-MIMO) transmission from an Access Point (AP), said signal field comprises a Very High Throughput Signal A (VHT-SIG-A) field, the signal field including a first field to identify a plurality of users, and a second field including a plurality of numbers of streams, each number of streams corresponding to a respective one of said plurality of users, said first field indicating locations of the plurality of numbers of streams in the second field;
   based on said first field, determining from said plurality of numbers of streams a number of streams corresponding to said STA; and
   receiving a data field of said MU-MIMO transmission using the number of streams corresponding to said STA.

13. The product of claim 12, wherein the first field indicates an order of said plurality of numbers of streams in said second field.

14. The product of claim 12, wherein said second field includes four numbers of streams corresponding to four users, respectively.

15. A method to be performed at a wireless communication station (STA), the method comprising:
   receiving a signal field of a downlink multi-user (MU) Multi-Input-Multi-Output (MU-MIMO) transmission from an Access Point (AP), said signal field comprises a Very High Throughput Signal A (VHT-SIG-A) field, the signal field including a first field to identify a plurality of users, and a second field including a plurality of numbers of streams, each number of streams corresponding to a respective one of said plurality of users, said first field indicating locations of the plurality of numbers of streams in the second field;
   based on said first field, determining from said plurality of numbers of streams a number of streams corresponding to said STA; and
   receiving a data field of said MU-MIMO transmission using the number of streams corresponding to said STA.

16. The method of claim 15, wherein the first field indicates an order of said plurality of numbers of streams in said second field.

17. The method of claim 15, wherein said second field includes four numbers of streams corresponding to four users, respectively.

18. A product including one or more tangible computer-readable non-transitory storage media comprising computer-executable instructions operable to, when executed by at least one computer processor, enable the at least one computer processor to implement one or more operations, the operations comprising:
   transmitting a signal field of a downlink multi-user (MU) Multi-Input-Multi-Output (MU-MIMO) transmission to a plurality of users, said signal field comprises a Very High Throughput Signal A (VHT-SIG-A) field, the signal field including a first field to identify the plurality of users, and a second field including a plurality of numbers of streams, each number of streams corresponding to a respective one of said plurality of users, said first field indicating locations of the plurality of numbers of streams in the second field; and
   transmitting a data field of said MU-MIMO transmission.

19. The product of claim 18, wherein the first field indicates an order of said plurality of numbers of streams in said second field.

20. The product of claim 18, wherein the data field is a beamformed data field.

21. The product of claim 18, wherein the data field is configured according to the plurality of numbers of streams.

22. The product of claim 18, wherein said plurality of users includes four users, the second field including four numbers of streams corresponding to said four users, respectively.

* * * * *